DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1147

T878,013

CARBODIIMIDE HARDENERS IN INCORPORATED COUPLER EMULSIONS

Edwin Nicholai Oftedahl and Mary Katherine DeSeyn, both of Kodak Park Division, Rochester, N.Y. 14650

Filed Feb. 24, 1969, Ser. No. 801,772

**Int. Cl. G03c *1/40***

U.S. Cl. 96—100

No Drawing. 10 Pages Specification

Photographic silver halide emulsions containing an incorporated pyrazolone magenta dye-forming coupler can be hardened with an incorporated carbodiimide hardener. Photographic elements comprising such emulsions, when exposed and processed, produce prints having low stain and high maximum density. Carbodiimide hardening agents including those described in Sheehan U.S. Pat. 2,938,892 issued May 31, 1960, Sheehan U.S. Pat. 3,135,-748 issued June 2, 1964, and Brunken German Pat. 7218 issued May 10, 1954, can be used. Suitable carbodiimide hardening agents can be represented by the formula $$R—N=C=N—R'$$

where each of R and R′ is an organic radical such as alkyl, alkoxy, allyl, aryl or heterocyclic groups. Typical examples of suitable carbodiimide hardening agents which are incorporated in the photographic materials described herein are 1,3-dimethylcarbodiimide, 1-methyl-3-methoxymethylcarbodiimide, dicyclohexylcarbodiimide and 1-ethyl-3-[3-dimethylaminopropyl] - carbodiimide hydrochloride.

A process for preparing the aforementioned photographic silver halide materials from coating compositions comprising incorporated pyrazolone magenta dye-forming couplers and carbodiimide hardening agents is also disclosed.

The emulsions of the invention can be used in photographic elements in layers containing high-speed chemically sensitized and spectrally sensitized silver halide emulsions, anti-foggants, coating aids, plasticizers, conventional hardeners and the like, such as described in Dunn U.S. Pat. 3,297,446 (columns 4–9).